United States Patent [19]

Harpster

[11] Patent Number: 5,445,018
[45] Date of Patent: Aug. 29, 1995

[54] SYSTEM AND METHOD FOR MEASURING THE RATE OF FUEL COMSUMPTION OF AN INTERNAL COMBUSTION ENGINE

[75] Inventor: Joseph W. Harpster, Galena, Ohio

[73] Assignee: Intek, Inc., Westerville, Ohio

[21] Appl. No.: 188,558

[22] Filed: Jan. 27, 1994

[51] Int. Cl.$^6$ .............................................. G01F 9/00
[52] U.S. Cl. .................................................. 73/118.2
[58] Field of Search ................... 73/113, 114, 118.2; 123/514, 516

[56] References Cited

U.S. PATENT DOCUMENTS

| | | | |
|---|---|---|---|
| 4,061,024 | 12/1977 | Erwin | 73/114 |
| 4,255,968 | 3/1981 | Harpster | 73/204 |
| 4,450,820 | 5/1984 | Haynes | 73/114 |
| 4,479,465 | 10/1984 | Flynn | 73/114 |
| 4,745,800 | 5/1988 | Henning | 73/114 |
| 5,193,388 | 3/1993 | Kleinhans | 73/118.2 |

Primary Examiner—Richard E. Chilcot, Jr.
Assistant Examiner—Harshad Patel,
Attorney, Agent, or Firm—Mueller and Smith

[57] ABSTRACT

A system and method is described for measuring fuel consumption by combustion engines operated in a manner wherein one component of fuel is used for the process of combustion itself and another complementary component of that same fuel is employed within a recirculation path for the purpose of cooling functions, for example, the cooling of fuel injectors. A fuel combiner is incorporated within the fuel delivery system having an output at the suction side of a fuel pump. One input to this fuel combiner is recirculated fuel, while the opposite input is make-up fuel from the fuel tank. The method and system employs a fluid meter which measures the flow of make-up fuel at the input to the combiner. Return or recirculating fuel is cooled and degassed with a gas phase separator in a preferred embodiment. Additionally, a thermally based flow meter provides for enhanced accuracies with the system and method.

16 Claims, 2 Drawing Sheets

SYSTEM AND METHOD FOR MEASURING THE RATE OF FUEL COMSUMPTION OF AN INTERNAL COMBUSTION ENGINE

BACKGROUND OF THE INVENTION

Over the recent past, industry has recognized the importance of monitoring the fuel consumption of internal combustion engines. Such engines exhibit different rates of fuel consumption under various loading and associated operating conditions. With data accurately providing values of substantially instantaneous fuel consumption, engine performance can be evaluated, for example, the evaluation can indicate the physical state of spark plugs, fuel injectors, valves, combustion chamber deposits, and the like.

Business entities engaged in the operation of fleets of trucks and the like are concerned with evaluating the efficiency of the engines within each of their vehicles such that improved scheduling of maintenance can be realized which, in turn, promises savings of larger expenditures otherwise made for excess fuel consumption.

Engine and engine equipment designers recognize the benefits accruing from data representing accurate fuel measurement, for example where various forms of engines are employed with test stands to carry out the design of spark plugs, fuel injectors, and the like. Accurate fuel consumption measurement also is of considerable value in the marine industry. Those charged with the operation of ships and various sea vehicles are continually concerned with the instantaneous values of fuel consumption. This is particularly true where long, open water trips are undertaken. Very often, such trips are planned with only marginal fuel reserves and, thus, an unexpected elevation of fuel consumption or mismanagement of fuel consumption while at sea may endanger both life and property. Accurate fuel consumption monitoring also can be employed both in land and sea vehicle operations to monitor potential fuel leaks which otherwise would be unnoticed.

Typically, fuel consumption monitoring is desired in conjunction with internal combustion engines which employ fuel supply systems which carry out a fuel recirculation function. Such recirculation of fuel commonly is encountered with fuel injected systems and in certain carburetion systems. With these systems, fuel is supplied to the engine in excess of that required for combustion. The excess fuel occurring with this supply is used for the purpose of cooling engine mounted components such as fuel injectors. Following such cooling function, the now heated, return fuel is recirculated to the fuel storage source such as a tank through a common return line.

The commonly accepted approach for measuring fuel consumption for such recirculating fuel supply systems is to employ two flow meters. One of these flow meters is coupled within the supply line to the engine, while the other is positioned within the return line. Fuel consumption then is derived by subtracting the indicated flow rate in the return line from the flow rate in the supply line. This technique for measurement has been found to be quite erroneous, particularly where the engines are being operated at relatively slower rpms, for example at idle and low speed values. In this regard, a typical flow meter will exhibit a relatively high error characteristic for the noted lower and idle speeds. For instance, a conventional instrument rated at 1% of full scale may exhibit errors in the range of about 140% for lower speeds or rates of fuel flow. Correspondingly, at higher rpm and rates of fuel flow, the accuracies of these devices improve to values of about 5%. In consequence, the overall accuracy of such systems generally are found to be unsuitable to the effective early evaluation of engine performance.

SUMMARY

Figure 1:
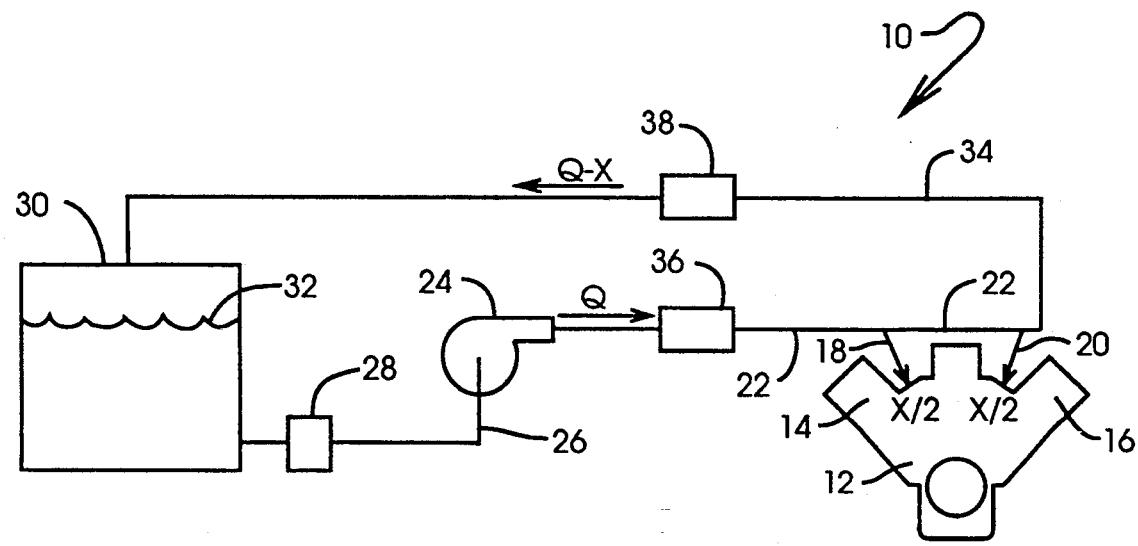
FIG. 1 is a schematic representation of a fuel consumption measurement system employed heretofore.

The present invention is addressed to a method and system for deriving the values for consumption of fuel by an internal combustion engine of a variety wherein fuel is recirculated with respect to the particular fuel introduction system involved. In this regard, typical of such engines are those employing a fuel injector system wherein one component of fuel supplied is directed to combustion, while a remaining component is employed for cooling pertinent components such as injectors and is thereafter recirculated to the fuel source. Other forms of recirculation systems are employed, for example, in carburetion systems for certain engine applications. The errors inherent in subtractive systems of the past are avoided through the utilization of a flow meter which is incorporated within the fuel delivery system in a manner wherein measurement of make-up fuel flow is made absent the presence of recirculating fuel flow. This may be accomplished through the utilization of a combiner which functions to receive make-up fuel from the fuel tank or fuel source and additionally to receive and combine recirculated fuel for presentation to the suction side of a fuel pump. With such an arrangement, the flow meter is called upon only to read fuel flow representing combusted fuel which is of lower flow rate than total flow within the supply line. With the arrangement, the error combination associated with full scale error value and with the subtraction procedure are avoided with the result of substantially improved accuracy and simplicity. In a preferred embodiment of the invention, the return fuel within a return conduit is submitted to a cooling function, as well as a step for carrying out gas phase separation. Additionally, significant improvements in accuracy can be realized through the utilization of a thermally-based flow meter.

Another feature of the invention provides a method for deriving a value for the consumption of fuel by an internal combustion engine operated with fuel from a fuel tank having a given tank pressure. The engine is one having a fuel injection assembly with a fuel injection pump having a suction input and a discharge output. The discharge output is coupled in fuel supply and cooling relationship with fuel injectors and the assembly has a return conduit carrying return fuel from the injectors. The method includes the steps of:

providing a fuel supply conduit between the fuel tank and the pump suction input, the supply conduit carrying make-up fuel from the fuel tank;

providing a fuel combiner at a combiner location within the fuel supply conduit;

providing a gas phase separator having an input and a fuel output coupled to convey fuel to the fuel combiner;

directing return fuel from the return conduit to the gas phase separator input removing non-condensible gases from said return fuel at said gas phase separator;

venting the removed non-condensible gases from the gas phase separator into the fuel tank to effect a substantial equalization of pressures therebetween;

directing the return fuel from the gas phase separator output to the fuel combiner to combine the return fuel with the make-up fuel; and measuring the rate of flow of the make-up fuel at a measurement location within the fuel supply conduit intermediate the combiner location and the fuel tank.

Another feature of the invention provides a system for deriving a value for the consumption of fuel by an internal combustion engine operated with fuel from a tank containing source thereof. Such engine is one having a fuel introduction system with a fuel pump having a suction input and a discharge output, the discharge output being coupled in fuel supply relationship with the engine for carrying out fuel combustion and recirculation functions. This fuel introduction system additionally includes a return conduit carrying return fuel for the recirculation function. The system includes a fuel supply conduit extending in fluid transfer relationship from the tank. A gas phase separator having an input coupled with the return conduit and a fuel output for removing non-condensible gases from the return fuel; a venting assembly coupled in gas transfer relationship between the gas phase separator and the tank. Additionally, a fuel combiner is provided having a first input coupled with the fuel supply conduit for receiving make-up fuel from the source, a second input for receiving the return fuel from the gas phase separator fuel output and an output coupled with the fuel pump suction input for supplying combined return fuel and make-up fuel thereto. A flow rate meter is coupled in fluid flow measuring relationship with the fuel supply conduit at a location intermediate the fuel combiner and the tank, and has a flow rate output corresponding with the flow of the make-up fuel. A readout is responsive to the flow rate output for providing a perceptible indication of the noted value.

Other objects of the invention will, in part, be obvious and will, in part, appear hereinafter.

The invention, accordingly, comprises the system and method possessing the design, construction, steps and arrangement of components which are exemplified in the following disclosure.

For a fuller understanding of the nature and objects of the invention, reference should be made to the following detailed description taken in connection with the accompanying drawings.

DETAILED DESCRIPTION

Referring to FIG. 1, the schematic representation of fuel consumption monitoring systems as heretofore have been provided is depicted. In the figure, a fuel introduction system is represented generally at 10 in conjunction with an internal combustion engine represented symbolically at 12. Engine 12 is of a "V" configuration having two cylinder head sections or regions represented at 14 and 16. Cylinder head sections 14 and 16 are considered to perform in conjunction with a fuel recirculating arrangement wherein a portion or component of the fuel supplied to engine 12 is utilized for combustion as labeled at respective arrows 18 and 20. For descriptive purposes, these arrows 18 and 20 indicate a fuel consumption of one-half total consumption, i.e. x/2 of the fuel quantity x employed in combustion. Introduction of this fuel is from a supply conduit 22 extending, in turn, to the discharge output of a fuel pump 24. The suction input of fuel pump 24 is, in turn, coupled to a source output conduit 26 which is seen to extend through a filter 28 to a fuel tank 30. The fuel level within tank 30 is represented at 32.

Returning to engine 12, it may be observed that not all of the fuel supplied from supply conduit 22 is combusted at engine 12, a portion of that supply fuel being utilized for cooling purposes and shown to be recirculated through a recirculating return conduit 34. It may be noted that return conduit 34 is directed back to the upper input to tank 30 above fuel level 32. This input may be above or below fuel level 32. In conventional fuel consumption monitoring practice, a first flow meter as at 36 is provided within supply conduit 22. This flow meter 36 provides an output corresponding with the flow rate of total fuel supplied through conduit 22 which may be designated, Q. In addition to the flow meter 36, a second flow meter 38 is provided within return conduit 34 to measure the flow rate of fuel passing therethrough and returning to tank 30. The value of this flow rate may be designated as: $Q-x$. The indications of Q and $Q-x$ are represented in FIG. 1 in conjunction with flow directional arrows for convenience.

The fuel consumption rate exhibited by the engine 12 will, using the notation above, represent the subtraction: $Q-(Q-x)$ which results in a consumption of value, x.

An example for the performance encountered with the arrangement of FIG. 1 may be characteristically tabulated as set forth in Table I. In Table I, under the heading "Condition", two conditions for the operation of engine 12 are presented, to wit, an idle condition and a full throttle condition. The engine rpm heading of Table I indicates an exemplary 800 rpm for idle performance and 5,000 rpm for full throttle performance. Looking to the next designation of Table I, fuel consumption limits for engine 12 are designated as being 1% of the value of Q at an idle operation and, correspondingly, 30% of the value Q for a full throttle operation.

Next, looking to the flow rate ranges, flow meter 36, designated in Table I as "FM1" will measure the value of Q for both idle and full throttle performance of engine 12. By contrast, flow meter 38, herein designated as "FM2" will measure 0.99 Q flow rate in accordance with the earlier-noted fuel consumption limited idle speed. Additionally, the flow meter FM2 will measure 0.70 Q flow rate for full throttle operation in correspondence with the designated fuel consumption limit at that performance modality.

Now looking to the next adjacent heading of Table 1, measurement error for conventional flow rate meters is listed. In general, for typically encountered flow rate meters, an error will be present in the amount of 1% of full scale for the full range of conditions between idle and full throttle of engine 12. Thus, the proportion of flow Q which always is an error will be, as listed 0.01 Q for all conditions.

Now extrapolating the above-listed criteria and values, it may be observed under the heading, "Measured Consumption Error" that for an idle condition, the subtractive system of FIG. 1 will exhibit a measurement error of 140%. Correspondingly, for full throttle performance of engine 12, the measured consumption error can be computed to be 4.7%. The latter values combine the errors of the two instruments 36 and 38 as the square root of the sum of the square of the inaccuracy.

TABLE I

| Condition | Engine RPM | Fuel Consumption Limits | Flow Rate | | Measurement Error* | | Measured Consumption Error |
|---|---|---|---|---|---|---|---|
| | | | $FM_1$ | $FM_2$ | $FM_{1\%}$ | $FM_{2\%}$ | |
| Idle | 800 | 1% Q | Q | .99 Q | .01 Q | .01 Q | 140% |
| Full Throttle | 5,000 | 30% Q | Q | .70 Q | .01 Q | .01 Q | 4.7% |

*Based on $FM_1$ and $FM_2$ having 1% full scale error or 0.01 Q.

Figure 2:
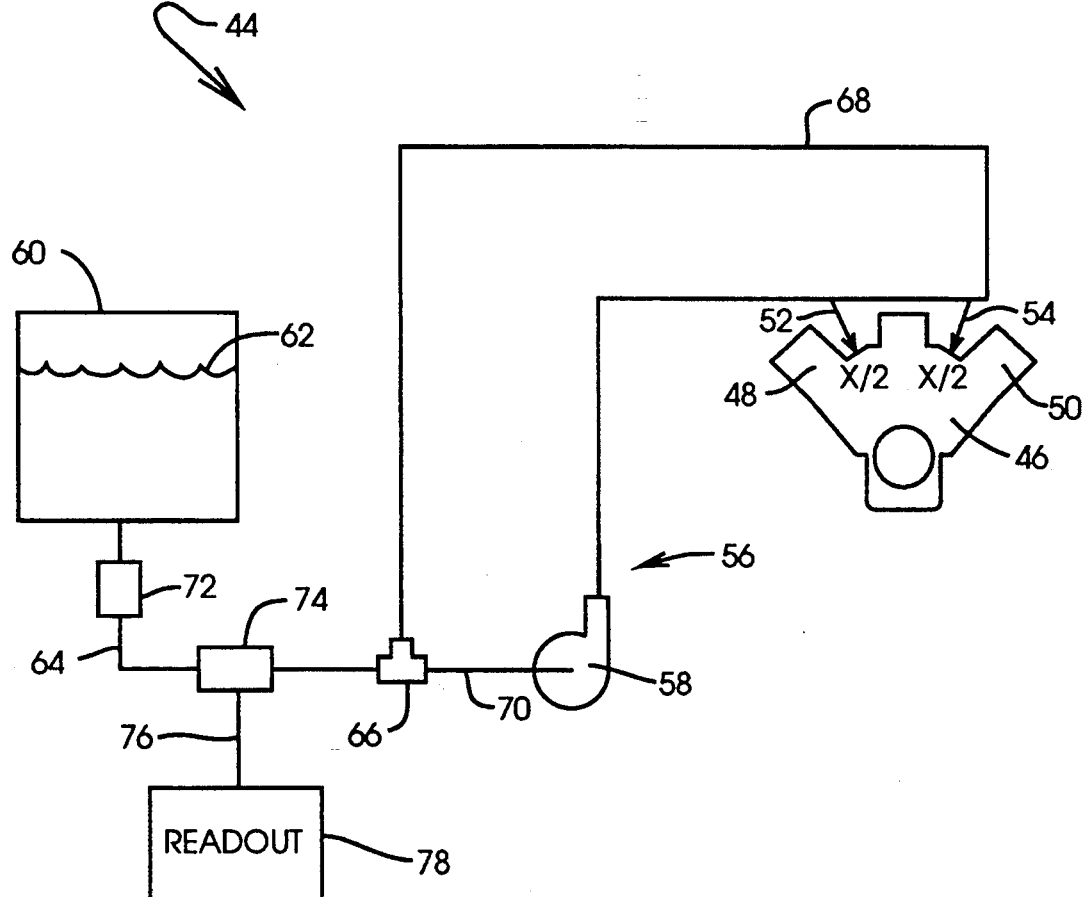
FIG. 2 is a schematic diagram of a basic version of a fuel consumption measurement system according to the instant invention.

Referring to FIG. 2, a basic embodiment of the present invention is revealed in schematic fashion. In the figure, a fuel introduction system is represented, in general, at 44 performing in conjunction with an internal combustion engine 46. Engine 46 is of a V configuration having cylinder head regions 48 and 50. As before, these cylinder head regions 48 and 50 receive an amount of fuel which is combusted as represented, respectively, by the arrows 52 and 54, each being labeled: "x/2" to indicate that each region 48 and 50 consumes one-half of the fuel used for combustion. The input of fuel to engine 46 is from a fuel supply conduit represented generally at 56 extending from engine 46 through a fuel pump 58 to the output of a fuel source represented at tank 60. The level of fuel within tank 60 is represented at 62. Fuel supply conduit 56 includes a make-up fuel component 64 which extends from the bottom of tank 60 to a fuel combiner 66 which may, for example, be implemented as a "T" conduit connection or coupling. Note that make-up fuel component 64 is introduced or coupled to one input of the fuel combiner 66. Correspondingly, a second input to the combiner 66 extends and is coupled to a return conduit 68 carrying return fuel from the engine 46. The output of combiner 66 at conduit component 70 carries the combined make-up fuel from conduit component 64 and return fuel from conduit 68 which has been generally identified with the above quantity, Q, as discussed in FIG. 1. A filter as at 72 is seen coupled within make-up fuel conduit 64.

In accordance with the invention, an accurate measurement of the flow of make-up fuel within conduit 64 as it is present intermediate tank 60 and combiner 66 is carried out utilizing a flow meter 74. The readout from flow meter 74 which corresponds with the amount of flow of make-up fuel is generally published or provided as some visual indication to the system user as represented at line 76 and block 78.

It may be noted with the arrangement of FIG. 2 that only one flow meter is employed. This flow meter is called upon to measure only the consumption of combusted fuel at engine 46, i.e. the value "x", having a maximum value of $x_{max}$.

Recalling the data set forth in Table I above, it may be observed that the maximum range requirement for the meter 74 is 30% of the earlier-described flow rate quantity, Q. With a 1% full scale accuracy for the flow instrument, the corresponding full scale value error is one-third of that otherwise required in the prior art system. This may be interpreted as indicating that at an idle speed for engine 46, an error of about 30% will be encountered as opposed to the earlier-noted 140%. Correspondingly, an error of about 1% will be encountered as opposed to the earlier-noted 4.7% error for full throttle performance of engine 46.

Figure 3:
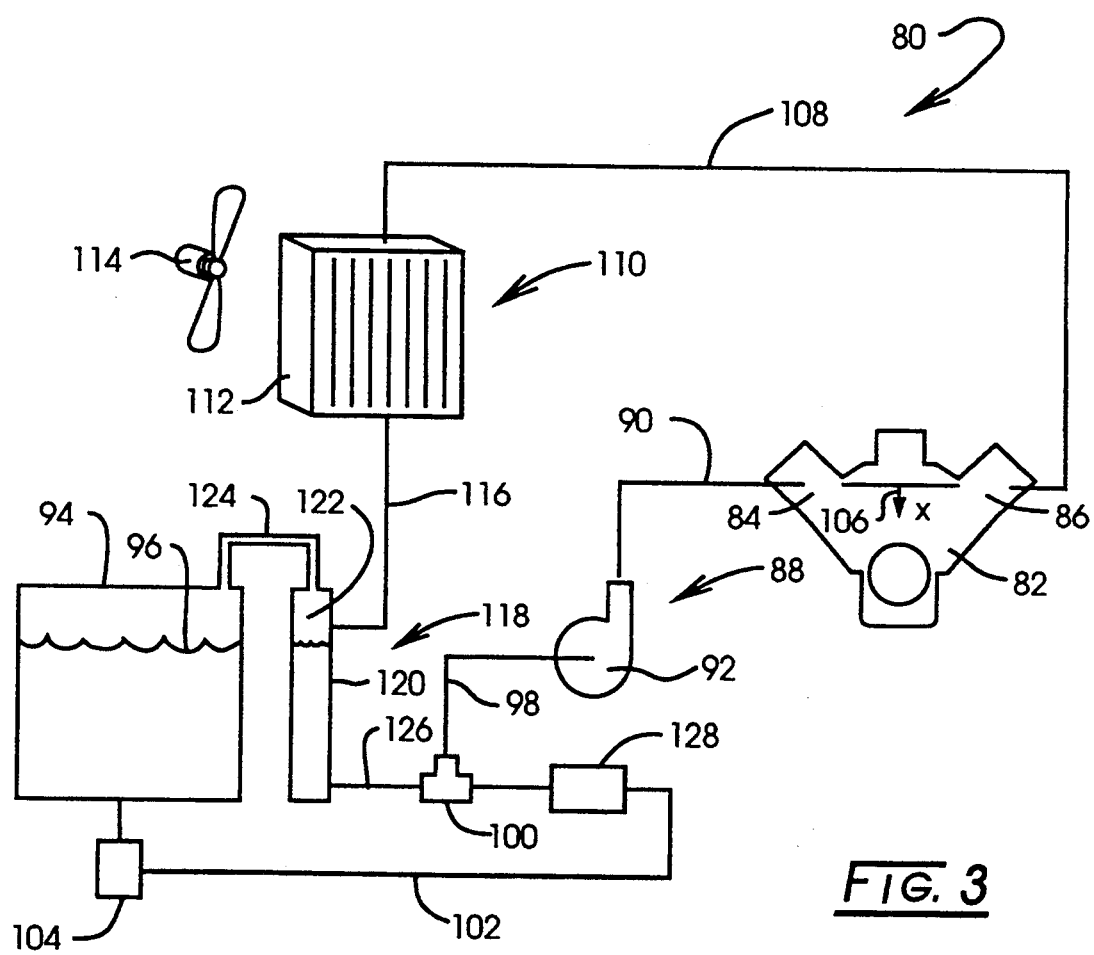
FIG. 3 is a schematic representation of a system for measuring fuel consumption showing a preferred arrangement according to the invention.

While the arrangement shown in FIG. 2 may find, for example, applications to engine operation of very limited duration, temperature, environmental effects and the like, it can be supplemented to perform in conjunction with normally encountered engine operational conditions. This supplemental arrangement is represented in conjunction with FIG. 3. Referring to FIG. 3, the fuel introduction system 80 is shown associated with an internal combustion engine 82 having, as before, two cylinder head regions 84 and 86. Extending to these two cylinder head portions or regions is a fuel supply conduit represented generally at 88 which includes a component 90 extending from the discharge side of a fuel pump 92. Supply conduit 88 extends to a fuel storage tank 94 having a fuel level shown at 96. This fluid flow connection, however, is through a combined fuel conduit component 98 extending, in turn, to the output of a fuel combiner 100. A first input to the fuel combiner 100 is coupled to a make-up conduit component 102 which extends through filter 104 to the lower region of fuel tank 94. At engine 82, it may be observed that the amount of fuel, x, combusted again is represented at an arrow 106 which directs fuel to be combusted to the regions 84 and 86. A quantity of the supplied fuel is employed for recirculation, i.e. carrying out a cooling function or the like, and the fuel not combusted is directed along a return conduit 108 to the second input of combiner 100. However, the return fuel within conduit 108 is cooled at a cooler 110 depicted herein as a radiator 112 associated with a fan 114. The thus-cooled return fuel generally will retain non-condensable gases which may have been present earlier as dissolved gas within the fuel tank 94. Typically such fuel outgases in the course of being heated, as well as manipulated or agitated by pump 92 and in the course of its circulation at engine 82. The cooled return fuel is directed from cooler 110 as represented by conduit component 116 to a gas phase separator represented generally at 118. Gas phase separator 118 is shown implemented as a standpipe 120 having an elevated input region 122 which is vented by a vent channel 124 to the upper region of fuel tank 94, i.e. above the fuel level 96. The output of gas phase separator 118 or standpipe 120 is provided at return conduit component 126 which is directed to the second input of combiner 100. With the arrangement shown, the fuel level within standpipe 120 will generally correspond with that at 96 within tank 94 by virtue of the connection or association of conduit component 126 with conduit component 102 leading, in turn, through filter 104 to tank 94.

As before, a singular flow meter is employed to measure the flow of make-up fluid within conduit component 102. This flow meter is represented in block diagrammatic fashion at 128.

While a broad variety of flow meters may be provided to carry out the function of measuring the flow of make-up fuel delivered from conduit component 102, the preferred form of flow meter is generally described as a thermally responsive one which, in particular, is responsive to the transfer of heat introduced to the fuel to derive a flow output. This form of flow meter is described and claimed in U.S. Pat. No. 4,255,968 by Harpster, issued Mar. 17, 1981, and assigned in common herewith. That patent by Harpster is incorporated herein by reference. In general, such flow meters utilize a temperature sensor which is mounted upon a conduit carrying fluid to be monitored. Downstream from this temperature sensor is another temperature sensor, as well as a heater. With the arrangement, the upstream sensor is set as a reference device for the temperature of the fuel as it emanates from the source, here tank 94. The downstream sensor is under the influence of the heater and will always be at a temperature higher than the upstream temperature sensor. As moving fuel fluid removes heat from the heater component at an efficiency or heat transfer coefficient that increases with increasing flow rate, the heater and temperature sensor associated with it in thermal communication will decrease in temperature. However, it is observed that the same amount of heat is removed by the fluid or fuel stream at all flow rates, it being removed with more efficiency at higher flow rates. The flow monitoring system recognizes that for the above-described geometry, the differential between the signal values of the upstream and downstream sensors may be related logarithmically or exponentially with a range of fluid flows. The meter then looks to the characterization of that differential signal over a range of flow rates.

Figure 4:
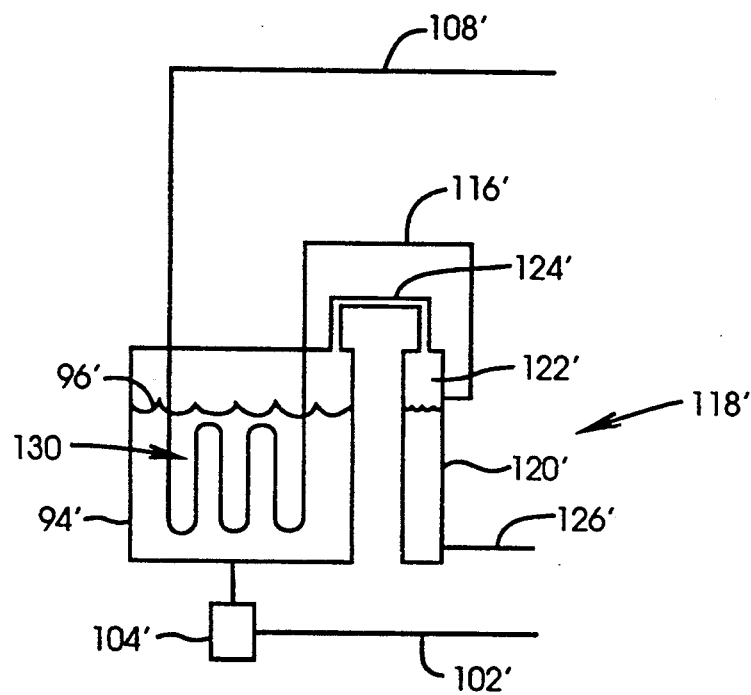
FIG. 4 is a partial schematic diagram showing a version of the fuel consumption measurement system of FIG. 3 with a variation for carrying out return fuel cooling.

A variation of the arrangement of FIG. 3 is represented in FIG. 4 where a conventional radiator type cooler as described at 110 is replaced. In the figure, components which are common with those described in connection with FIG. 3 are identified with the same numeration but in primed fashion. Accordingly, looking to FIG. 4, it may be observed that the return conduit 108' now is directed into tank 94' to a cooling coil represented in general at 130. Coil 130 is seen submerged below the fuel level line 96' and emerges from tank 94' as conduit component 116' which is introduced to upper region 122' of standpipe 120'. As before, standpipe 120' is the implementation of a gas phase separator 118' and the output thereof is directed along line 126' for fluid flow communication with an input of a fuel combiner described in conjunction with FIG. 3 at 128. In similar fashion, make-up fuel exits from tank 94' and passes through filter 104' to supply conduit component 102'.

As noted above, substantial improvements in the accuracy of measurement of the system of the invention are realized through the utilization of a singular flow meter which functions to measure make-up fuel quantities. Initial improvement can be realized through the utilization of a thermally responsive flow meter as described above. Referring to Table II, the improved results for both meter embodiments are compiled. In Table II, the condition heading reappears showing an idle condition and full throttle condition for the engine being employed. Additionally, the engine rpm exemplified for idle and full throttle are represented, respectively, as 800 rpm and 5,000 rpm. Next adjacent to the engine rpm heading is a fuel consumption heading. It now may be observed that the flow meter employed with the instant system is not measuring, Q, for example as described at 36 in conjunction with FIG. 1. In particular, for an idle condition, as represented in Table II, the flow meter as at 74 (FIG. 2) or 128 (FIG. 3) is measuring, for an idle condition, one-thirtieth of the maximum flow of make-up fuel, designated in the table as $x_{max}$. Correspondingly, the measurement made by the flow meter for a full throttle condition is the maximum flow of make-up fuel as represented in the table as $x_{max}$.

TABLE II

| Condition | Engine rpm | Fuel Consumption | Measured Consumption Error | |
|---|---|---|---|---|
| | | | $\pm 1\%$ FS Meter | $\pm 1\%$ of Reading Meter |
| Idle | 800 | 1/30 $x_{max}$ | 30% | 1% |
| Full Throttle | 5,000 | $x_{max}$ | 1% | 1% |

Now looking to the corresponding measurement consumption error, it may be observed that for a flow meter of conventional variety exhibiting a 1% full scale error, the measurement consumption error will be 30% at idle speed. By comparison, the noted thermally based flow meter will exhibit an error of 1% of the measured reading or measured value of flow. Accordingly, the 30% error of conventional meters now reduces to 1% as indicated in Table II.

Looking to a full throttle condition, the lower 1% error value remains for both meter applications.

Since certain changes may be made in the above-described system and method without departing from the scope of the invention herein involved, it is intended that all matter contained in the description thereof or shown in the accompanying drawings shall be interpreted as illustrative and not in a limiting sense.

I claim:

1. The method for deriving a value for the consumption of fuel by an internal combustion engine operated with fuel from a fuel tank having a given tank pressure, said engine having a fuel injection assembly with a fuel supply pump having a suction input and a discharge output, said discharge output being coupled in fuel supply and cooling relationship with fuel injectors and said assembly having a return conduit carrying return fuel from said injectors, comprising the steps of:

providing a fuel supply conduit between said fuel tank and said pump suction input, said supply conduit carrying make-up fuel from said fuel tank;

providing a fuel combiner at a combiner location within said fuel supply conduit;

providing a gas phase separator having an input and a fuel output coupled to convey fuel to said fuel combiner;

directing return fuel from said return conduit to said gas phase separator;

removing non-condensible gases from said return fuel at said gas phase separator;

venting said removed non-condensible gases from said gas phase separator into said fuel tank to effect a substantial equalization of pressures therebetween;

directing said return fuel from said gas phase separator output to said fuel combiner to combine said return fuel with said make-up fuel; and measuring the rate of flow of said make-up fuel at a measurement location within said fuel supply conduit intermediate said combiner location and said fuel tank.

2. The method of claim 1 in which said step for measuring the rate of flow at said measurement location is carded out by providing a flow meter having a flow rate output at said measurement location.

3. The method of claim 2 including the steps of:
converting said flow rate output to a numerical value; and
publishing said numerical value as a value substantially corresponding with the instantaneous value of fuel consumption of said engine.

4. The method of claim 2 in which said flow meter is responsive to the transfer of heat introduced to said fuel to derive said flow rate output.

5. The method of claim 1 including the step of cooling said return fuel substantially to the ambient environment of said source.

6. The method of claim 1 wherein said venting of said removed non-condensible gases into said fuel tank is carried out continuously.

7. The method of claim 1 including the step of:
providing a heat exchanger within said fuel tank in heat exchange relationship with said fuel therein and having a heat exchanger input and a heat exchanger output; and
said step for directing return fuel from said return conduit is carried out by directing said return fuel to said heat exchanger input and thence from said heat exchanger output into said gas phase separator input.

8. The method of claim 1 in which said gas phase separator is provided as a standpipe.

9. The method of claim 1 in which said fuel combiner is provided as a "T" conduit connection.

10. The method for deriving a value for the consumption of fuel by an internal combustion engine operated with fuel from a tank contained source thereof, said engine having a fuel introduction system with a fuel pump having a suction input and a discharge output, said discharge output being coupled in fuel supply relationship with said engine for carrying out fuel combustion and recirculation functions, said fuel introduction system including a return conduit carrying return fuel for said recirculation function, comprising the steps of:
providing a fuel supply conduit extending in fluid transfer relationship from said tank;
providing a fuel combiner having a first input coupled with said fuel supply conduit for receiving make-up fuel from said source, a second input for receiving said return fuel and an output coupled with said fuel pump suction input for supplying return fuel and make-up fuel thereto;
separating non-condensible gases from said return fuel prior to the receipt thereof by said fuel combiner;
continuously venting said separated non-condensible gases into said tank;
providing a flow rate meter coupled in flow rate measuring relationship with said fuel supply conduit at a location intermediate said tank and said fuel combiner first input to derive a flow rate output corresponding with the rate of flow of said make-up fuel; and
deriving a readout corresponding with said flow rate output as said value for the consumption of fuel.

11. A system for deriving a value for the consumption of fuel by an internal combustion engine operated with fuel from a tank contained source thereof, said engine having a fuel introduction system with a fuel pump having a suction input and a discharge output, said discharge output being coupled in fuel supply relationship with said engine for carrying out fuel combustion and recirculation functions, said fuel introduction system including a return conduit carrying return fuel for said recirculation function, comprising:
a fuel supply conduit extending in fluid transfer relationship from said tank;
a gas phase separator having an input coupled with said return conduit and a fuel output for removing non-condensible gases from said return fuel;
a venting assembly coupled in gas transfer relationship between said gas phase separator and said tank;
a fuel combiner having a first input coupled with said fuel supply conduit for receiving make-up fuel from said source, a second input for receiving said return fuel from said gas phase separator fuel output, and an output coupled with said fuel pump suction input for supplying combined return fuel and make-up fuel thereto;
a flow rate meter coupled in fluid flow rate measuring relationship with said fuel supply conduit at a location intermediate said fuel combiner and said tank, and having a flow rate output corresponding with the rate of flow of said make-up fuel; and
a readout responsive to said flow rate output for providing a perceptible indication of said value.

12. The system of claim 11 in which said flow meter is a thermally responsive flow meter responsive to the transfer of heat introduced to said fuel to derive said flow rate output.

13. The system of claim 11 including a cooling assembly coupled with said return conduit for cooling said return fuel substantially to the ambient environment of said tank.

14. The system of claim 11 in which said venting assembly is coupled in continuous gas transfer relationship between said gas phase separator and said tank.

15. The system of claim 11 in which said gas phase separator is a standpipe.

16. The system of claim 11 in which said fuel combiner is provided as a "T" conduit connection.

* * * * *